3,313,708
DEVICE FOR AVOIDING CERTAIN LOSS OF HEAD EFFECTS IN THE CHANNELS OF A NUCLEAR REACTOR TRAVELLED THROUGH BY A LIQUID
Antonio Angelini and Jacques Dufresne, Varese, Italy, assignors to European Atomic Energy Community—Euratom, Brussels, Belgium
Filed Mar. 25, 1964, Ser. No. 354,710
Claims priority, application Belgium, Apr. 11, 1963, 505,010
6 Claims. (Cl. 176—52)

The present invention relates to a device for avoiding certain effects due to a pressure drop in the channels of a nuclear reactor travelled through by a liquid. It is particularly directed, although not exclusively, to the suppression of the variation in the static pressure due to the effect of loss of head or pressure drop in the channels of a nuclear reactor cooled by a liquid and, notably, the case where such reactors are provided with vertical channels in which the cooling liquid flows downwardly.

It is known that the thermal energy produced within a nuclear reactor is removed by means of a heat-carrying fluid which is often a liquid such as water, heavy water, organic liquids, which have a good heat absorption. This liquid flows along the walls of the fuel elements arranged wthin tubes capable of resisting the operating pressure and temperature; these tubes are called "power tubes." To avoid heat exchange between the power tube and the moderator within which it is mounted, the power tube is insulated. This thermal insulation may be obtained by means of a layer of stagnant gas enclosed between the said power tube and a second tube, coaxial and external thereto, called "calender tube."

It will be realized that, under these conditions, difficult tightness problems arise at the ends of these tubes which, being at different temperatures, do not expand equally, whereas the various fluids (cooling liquid, insulating gas, eventually moderator liquid) being at different pressures, tend to flow away towards lower pressure zones.

The tightness problem caused by the insulating gas has been solved by welding the upper end of the power tube to the reactor tank, or to a plate which in turn is welded to the said tank, and by immersing the lower end of the said power tube in an individual collector of cooling liquid. The gas is thus imprisoned between the two coaxial tubes and the free level of the cooling fluid in the collector. In order to avoid diffusion of refrigerant vapours in the insulating space, in the case of organic liquid principally, the process disclosed in Belgian Patent No. 623,163, to the instant applicant, may be used.

However, in order to maintain the pressure of the refrigerant liquid, at the outlet of the chanels, that is at their lower end, all individual collectors must communicate with a pressurizer which could simply be a reservoir, partially filled with the same liquid, mounted above the main collector and above which there is an atmosphere of pressurized gas connected to each of the insulating gas layers surrounding the channels.

The free level of each individual collector is slightly higher than that in the pressurizer, the difference in height being equal to the loss of head between the two points under consideration. However, this system is only good if the flow remains substantially the same in all the channels. When reactor fuel elements are unloaded during its operation, from the moment when a channel no longer has any element, its flow increases appreciably.

In order to limit this flow of refrigerant liquid, the inlet collector (at the upper end), is provided with a valve having three positions: a slightly closed normal position, a three quarter closed position and a completely closed position. The normal position of this valve is used to set the flow in each channel in such a manner as to obtain a uniform temperature at the outlet of all of the channels; thus the valves in the peripheral channels are closed more than those in the central channels. The loss of head produced by this valve also serves to limit the flow of refrigerant liquid should the channel burst or when the first fuel elements are removed. The three quarter closed position is used during removal of the second part of the elements, and the closed position is used whenever the power tube bursts.

All these valves are controlled manually because, even in the case where a channel bursts, isolation of the channel must not be instantaneous. Now, in spite of these valves, appreciable flow variations in the channels occur. The variations cause rising of the free level in the collector due to an increase in the loss of head between this collector and the pressurizer, which would necessitate a very long collector, therefore a very long power tube. As the latter must extend across the whole reactor, fluctuations in the level must not be allowed to become greater than a certain limiting value, for instance 0.5 to 1 m.

In accordance with the invention, a system for suppressing certain effects of loss of head in the reactor channels traversed by a liquid and dipping into this liquid at the lower end thereof, the level of this iquid being in contact with an atmosphere of pressurized gas, is characterized in that the lower end of each channel is constricted below the free level of the liquid in which it immerses, in such a manner that the decrease in the static pressure thus caused exactly balances the increase in total pressure due to the increase in the loss of pressure produced by the increase in flow.

According to the invention, a device for suppressing certain effects due to a loss of head in the channels of a reactor traversed by a liquid and dipping into said liquid at the lower end thereof, the said liquid being topped by an atmosphere of pressurized gas, is characterized by a constriction at the lower end of each channel below the free level of the liquid into which it dips.

Preferably, in such a device, all channel constrictions are identical and correspond to the tube having the greatest loss of pressure, and at each channel outlet is mounted a valve capable of adjusting the loss of head in such a way as to stabilize the liquid level in the corresponding channel, or to insulate the channel in the case it should burst.

In this device, the liquid in which each channel dips, on the one hand, and the atmosphere which tops the liquid around the channel, on the other hand, are respectively connected to the lower end and the upper end of one or several pressurizing enclosures containing the same liquid and the same atmosphere under a suitable pressure, the said pressurizing enclosures being in turn interconnected in such a way as to balance their respective pressures.

As a non-limitative example, there will be described hereinafter an embodiment of the invention having reference to the appended drawing wherein.

Figure 1:
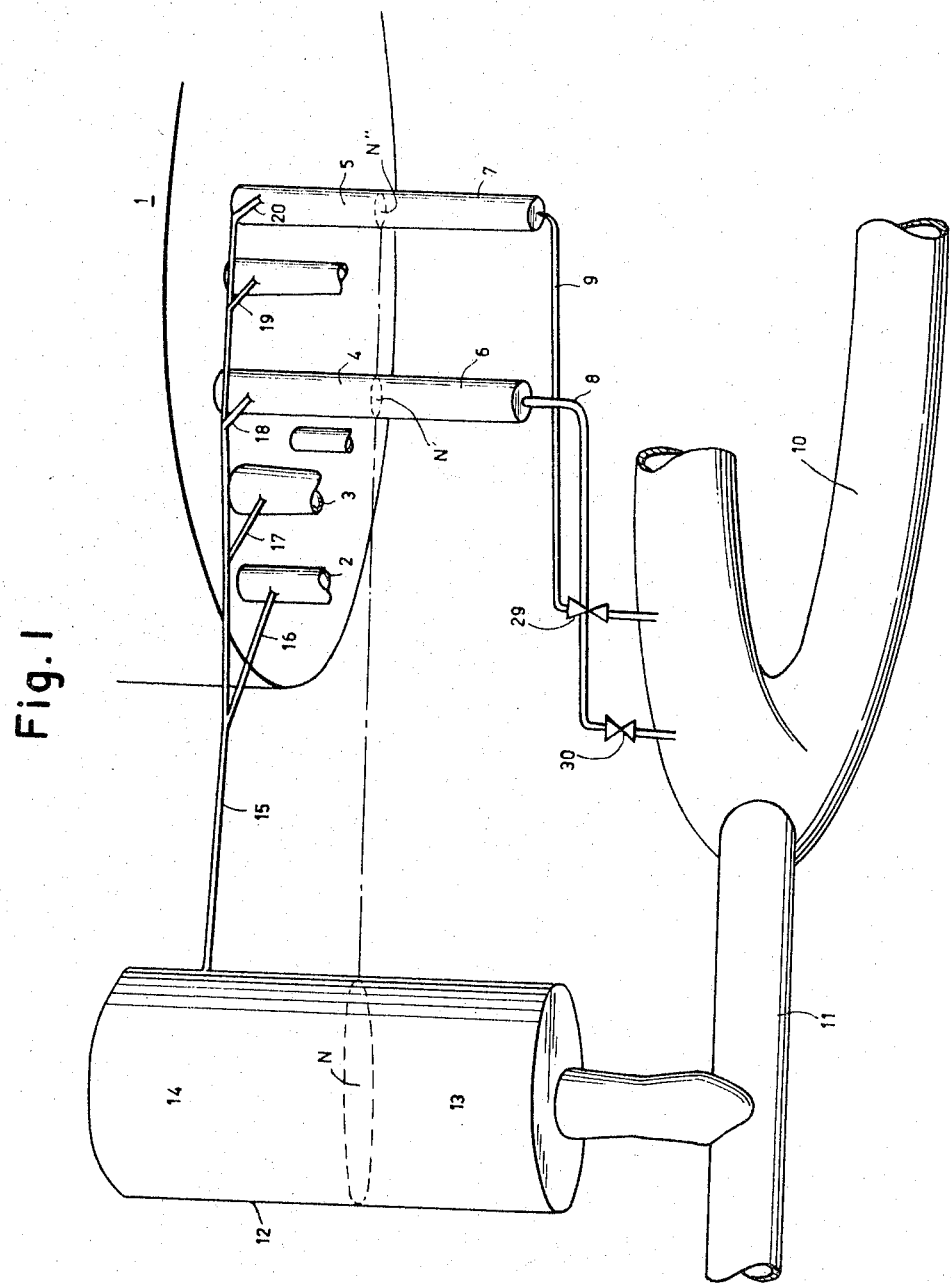
FIG. 1 is a perspective view of the lower end of a liquid cooled nuclear reactor having vertical channels.

FIG. 1 illustrates a metallic tank 1 of a nuclear reactor having vertical channels 2, 3, 4, 5. Each of these channels extends, at the lower end, into an individual collector such as 6 or 7 and outlet pipes 8 or 9 connect them to a main collector 10. A conduit 11 joins collector 10 with the heat exchangers of the system (not shown).

A pressurizing enclosure 12 is provided above conduit 11 and connected thereto, the said enclosure containing, at 13, the same liquid as that which circulates in the channels, and an atmosphere 14 of gas under pressure lying above the level of liquid 13. This atmosphere is connected by a balancing pipe 15 and individual branches 16, 17, 18, 19, 20 to the various channels, inside of which there is a peripheral layer of insulating gas adapted to protect the moderator against the thermal flow coming from the fuel elements and the refrigerant liquid.

The free levels, N in the pressurizer, N' and N" in the channels, are theoretically equal.

Figure 2:
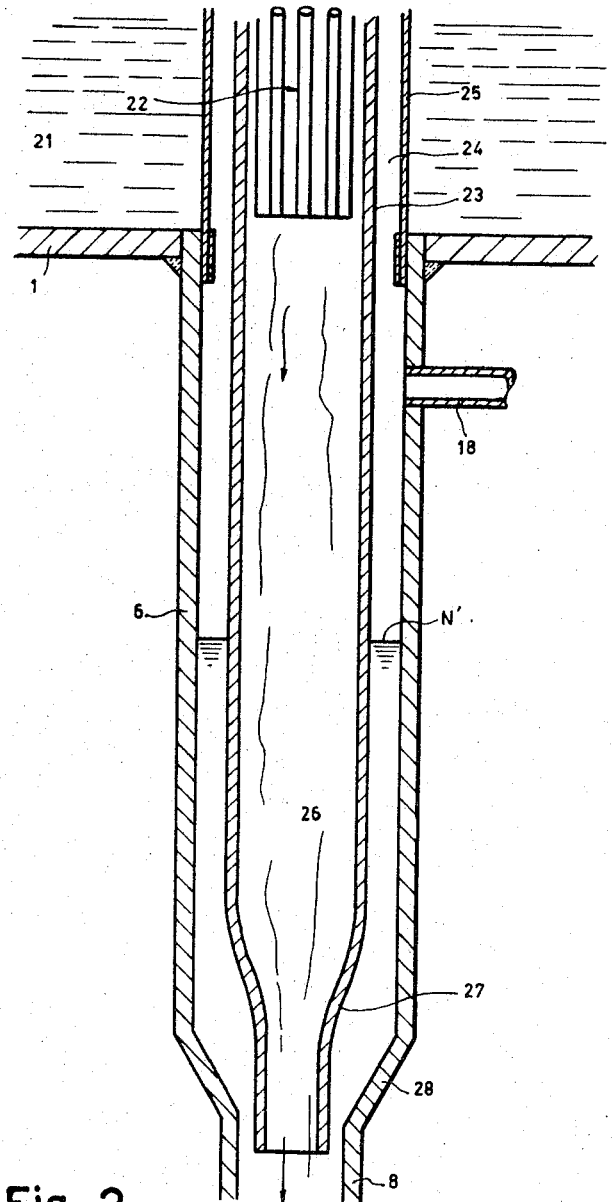
FIG. 2 is an axial vertical cross-sectional view of the base of a channel improved in accordance with the present invention.

Turning now to FIG. 2, the base of a channel, improved in accordance with the teaching of the invention, will now be described in more detail. There is again the bottom of tank 1 which contains moderator 21, such as heavy water, individual collector 6 at the base of the channel, outlet pipe 8 and branch 18 adapted to balance the gas pressure with that in the pressurizer. It is again seen, in the channel, the lowest fuel element 22 surrounded, inwardly of the reactor tank, successively by the power tube 23, the gaseous insulating space 24, the calender tube 25 and the moderator 21.

Power tube 23, inside of which a cooling liquid 26 such as an organic liquid downwardly flows, dips into the same liquid below the free level N' thereof. According to the invention, tube 23 is constricted at the base 27 thereof and also constricted at 28 inside collector 6.

By way of example, the flow in each channel may be of 40 m.$^3$/h. and the pressure in the pressurizer from 4 to $8.10^5$ Pa (4 to 8 kg./cm.$^2$).

In accordance with the invention, each channel outlet, such as 8 or 9 (see FIG. 1) is provided with a valve 29 or 30 adapted to regulate the loss of pressure in the constriction of the corresponding channel, or to isolate the channel in case of bursting thereof.

It is to be understood that the invention is not to be limited to the specific embodiment which has just been described by way of example but should embrace any possible variation thereof.

We claim:

1. In a nuclear reactor including a moderator tank and a plurality of liquid cooled vertical channels extending through the bottom of said tank, each channel being formed of an inner power tube and an outer calender tube coaxial with and spaced from said power tube to form therewith an insulating chamber, the combination therewith comprising:
   at least one pressurizing enclosure containing the said cooling liquid and a gas under pressure;
   means joining the bottoms of said calender tubes and said enclosure whereby said liquid rises in said chamber to substantially the same level as that in said enclosure; said means including flow regulating valves;
   further means joining the portion of said enclosure containing said gas under pressure and said chamber above the cooling liquid level in each channel, and wherein
   the bottom of said power tube within said calender tube is constricted and lies below the cooling water level in said chamber.

2. In a nuclear reactor, a combination comprising a pressure tube for containing a flowing cooling liquid, the said tube having a lower outlet immersed into a bath of said liquid, a collector mounted around the outlet of said tube, means for supplying pressurized gas above the level of the liquid in said collector, adapted to reduce the fluctuations in the static head of the liquid in the collector due to variations in the loss of head in the collector outlet upon changes in the rate of flow of the liquid, constriction means around the outlet of the pressure tube, whereby the fluid flowing through the pressure tube outlet produces an ejector effect on the liquid in the collector above the outlet.

3. A reactor as claimed in claim 2, having a multiplicity of said pressure tubes with identical constriction means corresponding to the pressure tube having the greatest loss of head in the collector outlet, a valve at the outlet of each collector for regulating the loss of head to stabilize the liquid level in the corresponding collector or to isolate the pressure tube in the case of bursting thereof.

4. A reactor as claimed in claim 3, including at least one pressurising enclosure for containing cooling fluid and pressurized gas thereover and means to connect the liquid and gas of said enclosure to the liquid and gas of said collector, respectively.

5. A reactor as claimed in claim 4, comprising several pressurising enclosures and means interconnecting all of said enclosures to balance the respective pressures.

6. In a nuclear reactor including a moderator tank and a plurality of liquid cooled vertical channels extending through the bottom of said tank, each channel being formed of an inner pressure tube and on outer calender tube having an extension coaxial with an extension of the pressure tube below the bottom of the tank, said extension being spaced apart to provide a collector and a heat insulating chamber, the combination therewith comprising at least one pressurising enclosure which contains the said cooling liquid and a gas under pressure, means connected the bottom of said calender tube extensions and said enclosure whereby said liquid rises in said chambers to substantially the same level as that in said enclosure, said means including flow regulating valves; further means joining the portion of said enclosure containing said gas under pressure and said chamber above the cooling liquid level in each channel, and wherein the bottom of said pressure tube extension within said extension of the calender tube is constricted in proximity to a constriction of said calender tube extensions and lies below the cooling liquid level in said chamber.

References Cited by the Examiner

UNITED STATES PATENTS

| 2,977,297 | 3/1961 | Evans et al. | 176—52 |
| 2,980,667 | 4/1961 | Coombs | 176—61 |
| 3,031,388 | 4/1962 | Barchet | 176—78 |
| 3,060,111 | 10/1962 | Sherman et al. | 176—61 |
| 3,079,321 | 2/1963 | Oppenheimer et al. | 176—52 |
| 3,235,465 | 2/1966 | McDaniel et al. | 176—61 |

L. DEWAYNE RUTLEDGE, *Primary Examiner.*